US005790391A

United States Patent [19]
Stich et al.

[11] Patent Number: 5,790,391
[45] Date of Patent: Aug. 4, 1998

[54] STANDBY POWER SYSTEM

[75] Inventors: Frederick A. Stich; Peter W. Jungwirth, both of Wisconsin Rapids; Donald K. Zahrte, Sr., Necedah, all of Wis.

[73] Assignee: General Signal Corporation, Stamford, Conn.

[21] Appl. No.: 758,412

[22] Filed: Nov. 29, 1996

[51] Int. Cl.$^6$ .................. H02M 3/335; H02J 3/00; H02J 7/00
[52] U.S. Cl. .................. 363/24; 363/34; 307/66; 307/64
[58] Field of Search .................. 363/24–26, 34, 363/37, 41, 56; 307/66, 64, 38, 39, 41, 48, 46

[56] References Cited

U.S. PATENT DOCUMENTS

| | | | |
|---|---|---|---|
| 4,031,463 | 6/1977 | Norberg | 324/76.16 |
| 4,277,692 | 7/1981 | Small | 307/66 |
| 4,366,369 | 12/1982 | Hussey | 307/66 |
| 4,400,624 | 8/1983 | Ebert, Jr. | 307/43 |
| 4,473,756 | 9/1984 | Brigden et al. | 307/66 |
| 4,516,035 | 5/1985 | Rhoads et al. | 307/66 |
| 4,638,176 | 1/1987 | Martinelli | 307/64 |
| 4,692,854 | 9/1987 | Baxter, Jr. et al. | 363/75 |
| 4,694,402 | 9/1987 | McEachern et al. | 364/487 |
| 4,713,553 | 12/1987 | Townsend et al. | 307/64 |
| 4,763,014 | 8/1988 | Model et al. | 307/66 |
| 4,797,936 | 1/1989 | Nakatsugawa et al. | 324/76.12 |
| 4,814,934 | 3/1989 | Jones et al. | 361/88 |
| 4,885,521 | 12/1989 | Crampton | 307/66 |
| 4,890,005 | 12/1989 | Schornack | 307/87 |
| 4,956,563 | 9/1990 | Schornack | 307/66 |
| 5,055,703 | 10/1991 | Schornack | 307/64 |
| 5,229,651 | 7/1993 | Baxter, Jr. et al. | 307/66 |
| 5,237,258 | 8/1993 | Crampton | 307/66 |
| 5,315,533 | 5/1994 | Stich et al. | 364/480 |
| 5,440,179 | 8/1995 | Severinsky | 307/66 |
| 5,473,533 | 12/1995 | Mengelt | 364/152 |
| 5,578,876 | 11/1996 | Crampton | 307/66 |
| 5,579,197 | 11/1996 | Mengelt et al. | 361/93 |
| 5,602,462 | 2/1997 | Stich et al. | 323/258 |

OTHER PUBLICATIONS

Best Power Technology, Inc., Patriot User Guide, No. LTS–0379F, 1994.

*Primary Examiner*—Peter S. Wong
*Assistant Examiner*—Bao Q. Vu
*Attorney, Agent, or Firm*—Foley & Lardner

[57] ABSTRACT

A standby power system is provided having power conversion, output voltage control, and line-fault detection systems that make possible a significant reduction in the cost of the system. The standby power system provides backup power to a load, such as a computer system, when main AC line power fails. A system DC battery voltage is converted to an AC output voltage signal at line voltage levels by a power conversion system including a high frequency push-pull inverter, a light-weight low-cost high frequency transformer, a rectifier, and a line frequency inverter. The high frequency inverter is controlled to provide high frequency battery voltage pulse bursts separated by low frequency zero voltage dead times which are boosted by the transformer to line voltage levels and rectified by the rectifier. The line frequency inverter is controlled to provide the rectified line voltage level pulse bursts to the standby power system output in the form of a stepped square wave output signal at line frequencies. Rms and peak output voltage control is provided by a system controller based on a single digital output voltage control signal. The system controller detects the occurrence of AC line faults using a single digital line sense signal. Since analog-to-digital conversion of the power system input and output voltage waveforms is not required for line fault detection or output voltage control, the system controller may be implemented using a low-cost microprocessor.

35 Claims, 8 Drawing Sheets

STANDBY POWER SYSTEM

FIELD OF THE INVENTION

This invention pertains generally to the field of electrical power systems, and particularly to standby, backup, or uninterruptible power supplies or systems.

BACKGROUND OF THE INVENTION

Uninterruptible power supplies or systems, commonly referred to as UPS, are used to provide backup power to critical loads, such as computer systems, industrial microprocessor controlled systems, and the like, where a loss of line power can result in the interruption of programs and the loss of valuable data or a system malfunction. The UPS may also provide a line power conditioning function, to ensure that transient spikes, low voltage conditions, or distorted power waveforms on the AC power system do not disturb the operation of the computer or other system which is supplied with power through the UPS. Typically, the UPS includes a battery which is interfaced through an inverter to the AC output line. When a loss of AC line power is detected by the UPS, the critical load is disconnected from the AC power line, and the inverter is turned on to provide backup power to the load from the battery.

Generally, it is desirable that the power supplied to the critical load from the backup power system should be without a substantial break or discontinuity of power flow, despite breaks in the main AC power system power. Systems which can provide backup power without observable breaks or discontinuities in the waveform of the voltage supplied to the critical load, despite loss or disruptions of the AC input power, are often complex and relatively expensive. Lower cost backup power systems have been introduced which are intended for use with individual desktop computer systems rather than larger (and more expensive) computers or local area networks. These less expensive types of backup power systems commonly utilize a mechanical relay as the means by which power is transferred from the AC power system to the backup battery powered inverter. As a consequence, there can often be a significant break in the power supplied to the load. Such systems are sometimes referred to as "standby power supplies" or SPS in distinction from true uninterruptible power supplies in which there is no significant break in the output voltage waveform.

Standby power systems employ various methods for detecting faults in the main AC power system power so that transfers of power to the critical load from the AC line to battery backup power occur rapidly and with minimum disruption of the power supplied to the critical load. Such methods typically involve monitoring the incoming AC line voltage waveform and initiating transfer to backup power when the incoming voltage level falls below a selected threshold. For microprocessor controlled standby power systems, monitoring of the incoming AC voltage typically requires periodically sampling the incoming AC waveform signal and converting the sampled AC waveform signal into a digital signal using an analog-to-digital converter. The microprocessor controlled standby power system is thus able to provide rapid detection of and response to faults in the main AC power system power by monitoring the sampled and digitized AC waveform signal and initiating a transfer of power when the characteristics of the monitored waveform signal indicate a failure of the main AC power system power. This may be achieved, for example, by comparing the monitored waveform with a reference waveform. When the monitored waveform deviates by more than a selected amount from the reference waveform, a failure of the main AC power system power is indicated. Although line fault detection systems of this type provide fast and accurate detection of line power faults, such systems are also relatively expensive to implement, in that they require analog-to-digital conversion of the sampled AC line waveform signal as well as the implementation of relatively complex line fault detection algorithms, requiring the use of more sophisticated microprocessors.

When a failure of AC line power is indicated by the line fault detection system, the standby power system inverter is turned on to supply AC power to the critical load at line frequency and line voltage levels from the low voltage DC power provided by the standby power system battery. The relatively low battery voltage is boosted to the level needed to provide power to the critical load at AC line voltage levels by a power conversion system which typically includes a power transformer. Frequently, standby power systems rely on low (i.e., power line) frequency transformers to provide the necessary voltage boost function. However, low frequency transformers are heavy and expensive. Some standby power systems therefore employ a high frequency transformer in combination with an inverter to provide AC power at the desired voltage level to the critical load from the standby power system battery. The use of a high frequency transformer makes possible a cost and weight reduction of the standby power system.

An example of an uninterruptible power supply (UPS) that employs a high frequency transformer is described in U.S. Pat. No. 5,440,179 to Severinsky. The UPS described in this patent employs a high frequency fly-back transformer to provide voltage boosting of the DC battery voltage. A high frequency switching device is controlled to alternately connect and disconnect the system battery to a first winding of the high frequency fly-back transformer. When the high frequency switch is closed, the battery is discharged into the first winding of the transformer, providing magnetic energy thereto. When the high frequency switch is opened, the accumulated magnetic energy in the transformer discharges via a second winding of the transformer into an intermediate storage capacitor. The duty cycle of the high frequency switch is controlled such that the capacitor is charged to a voltage level corresponding to the desired AC output voltage level, from the lower voltage level of the system battery, by means of the high frequency fly-back transformer. A conventional four-switch inverter bridge is connected between the intermediate storage capacitor and the critical load. The inverter bridge is controlled to provide the storage capacitor voltage to the critical load in the form of a stepped square wave output signal at the power line frequency.

Although this type of power conversion system makes possible a reduction of the cost and weight of a standby power system, by using a high frequency, rather than a low frequency, transformer, the fly-back converter topology has several limitations. A fly-back converter draws large rms currents from the system battery. Thus, a high frequency switching device with a high volt-amp rating must be used to connect the system battery to the high frequency fly-back transformer. Moreover, the large rms current draw from the battery requires the use of a large electrolytic capacitor across the battery. This not only increases the cost and weight of the standby power system, but the use of a large capacitor across the battery can cause sparking and/or arcing when the system battery is changed. Also, the requirement for a large intermediate DC storage capacitor and a four-switch inverter bridge further increases the weight and cost of such a standby power system.

Another uninterruptible power supply employing a high frequency transformer is described in U.S. Pat. No. 4,638,176 to Martinelli. In this system, the system battery is connected via a high frequency inverter to the primary winding of a high frequency transformer. The high frequency inverter is controlled to provide positive and negative pulse width modulated (PWM) pulse bursts on the secondary winding of the transformer by alternately connecting opposite polarities of the DC voltage provided by the system battery to the primary winding of the transformer at a high frequency (25 kHz). A continuous stream of positive and negative PWM pulses are thereby provided to the primary winding of the transformer, and appear on the secondary winding thereof at a boosted voltage level corresponding to the AC line voltage level. Low frequency switching devices are connected between the secondary winding of the high frequency transformer and the critical load. The low frequency switching devices are controlled to connect alternately one of the positive or negative high frequency PWM pulse streams to the critical load, to thereby provide a square wave signal at line frequency to the load. Regulation of the output voltage level provided by the UPS to the load is achieved by varying the pulse widths of the high frequency pulses within the high frequency pulse streams, i.e., via pulse width modulation.

During operation of a standby power system to provide backup power to a critical load, the standby power system inverter is typically controlled to regulate the rms or peak output voltage level that is provided to the load from the battery. Thus, the standby power system is able to provide a stable output voltage level to the load in the presence of changing load or battery voltage conditions. Regulation of the standby power system output voltage level is typically achieved using a feedback system which monitors the output voltage waveform signal being provided from the standby power system to the load, compares the monitored signal with a reference level, and modifies control of the standby power system inverter accordingly in order to bring the output voltage being provided by the standby power system to the reference level. Regulation of the output voltage of the standby power system in this manner may be implemented using an analog feedback loop. For microprocessor controlled standby power systems, an analog-to-digital converter is typically required in order to convert a sampled output voltage waveform into a digital signal that may be compared by the microprocessor with a reference voltage level or reference waveform to provide output voltage regulation. The need for analog-to-digital conversion and complex control algorithms implemented in a sophisticated microprocessor to provide output voltage regulation further increases the cost and complexity of a standby power system employing conventional digital output voltage control mechanisms.

SUMMARY OF THE INVENTION

A standby power system in accordance with the present invention employs a low-cost power conversion system and simplified control circuitry, making possible the fabrication of an exceptionally low-cost standby power system. A standby power system in accordance with the present invention provides backup power to a critical load from a system battery via a power conversion system that includes a high frequency transformer and a minimal number of power electronic switching devices. The cost and size of the magnetics and filters that form the power conversion system are thereby minimized. A standby power system in accordance with the present invention is preferably controlled by a microprocessor based system controller which regulates the rms and peak output voltage level of the standby power system when providing backup power to a load. Output voltage control is provided based on a single isolated digital voltage control signal derived from the standby power system output voltage signal. The output voltage control signal is provided without the need for conventional analog-to-digital conversion or manipulation. The microprocessor based system controller preferably also provides line fault detection, for initiating a transfer from providing main AC power to the load to providing backup power to the load when failure of the main AC line power is indicated, and from backup power to main AC line power, when main AC line power returns. Line fault detection is provided based on a single isolated digital line sense signal that is derived from the input voltage waveform applied to the standby power system. The digital line sense signal is also provided without the need for conventional analog-to-digital conversion or manipulation. The power conversion system and simplified control circuitry of a standby power system in accordance with the present invention represent cost breakthroughs that make possible the fabrication of very low-cost power protection products for the home-office market.

A standby power system in accordance with the present invention has input terminals that are adapted to be connected to a main source of AC power, and output terminals adapted to be connected to a critical load. Under normal operating conditions, an AC input voltage signal from the main AC power source is provided from the input terminals, through the standby power system, to the output terminals, to thereby provide power to the load. The standby power system preferably provides surge suppression and noise filtering to condition the line power that is provided from the main AC power system to the load under normal operating conditions. Under normal operating conditions, the standby power system battery is charged from the main AC power line signal via a transformer, rectifier, and battery charger that is controlled by the standby power system controller. A line fault detection circuit provides an isolated digital line sense signal to the system controller based on the voltage level applied to the input terminals of the standby power system. This line sense signal is used by the system controller to detect the occurrence of a failure of the main AC power system power.

In response to a failure of the main AC power system power, the standby power system controller opens a line relay to isolate the output terminals of the standby power system from the failed main AC power system connected to the standby power system input terminals. Simultaneously with opening the line relay, the standby power system controller activates the standby power system power conversion system to provide an AC output signal on the output terminals of the standby power system to provide backup power to the critical load from the system battery.

The standby power system power conversion system converts the relatively low DC battery voltage to a linefrequency stepped square wave output signal of relatively constant rms voltage for all reasonable battery and load conditions. The stepped square wave output signal includes positive and negative voltage steps having magnitudes which are close to the normal peak voltage levels which were provided to the critical load by the main AC power system before it failed. The positive and negative voltage steps are separated by zero-voltage dead times. The durations of the voltage steps and zero-voltage dead times are varied to regulate the rms output voltage level provided by the standby power system.

A high frequency push-pull inverter is employed to convert the relatively low system battery voltage to the required peak output voltage level of the standby power system. The push-pull inverter is formed using high frequency switching devices, e.g., MOSFETs, in combination with a high frequency transformer. The high frequency switching devices are operated at a high frequency, e.g., 45 kHz, to alternately connect the standby power system battery in opposite polarities to a primary winding of the high frequency transformer. This high frequency modulation may be provided by an integrated circuit modulator or PWM controller which provides high frequency switching signals to the high frequency switching devices. The high frequency modulation of the high frequency switching devices is periodically interrupted by adjustable duration dead times at a rate of twice line frequency. The result is a train of high frequency positive and negative battery voltage pulse bursts, separated by low frequency dead times, applied to the primary winding of the transformer, causing high frequency pulse bursts at the line voltage level to appear on the secondary winding of the transformer. A diode bridge connected to the secondary winding of the transformer rectifies the positive and negative high frequency pulse bursts appearing on the secondary winding of the transformer to provide a rectified pulse train of high frequency pulse bursts, having peak voltage levels at the desired peak standby power system output voltage level, separated by variable duration dead times. A line frequency inverter including two line frequency power switching devices, e.g., IGBTs, connects the output of the diode bridge rectifier to the output terminals of the standby power system. The line frequency switches are controlled by the standby power system controller to apply alternately the rectified pulse bursts in opposite polarities to the output terminals of the standby power system. A stepped square wave output signal, at the line frequency, with positive and negative voltage steps corresponding to the high frequency pulse bursts on the secondary winding of the transformer, separated by zero-voltage dead times corresponding to the dead times on the secondary winding of the transformer, is thus provided to the standby power system output terminals. The zero-voltage dead times between pulse burst voltage steps are preferably maintained by controlling the line frequency switching devices to conduct simultaneously during the zero-voltage dead times to provide a short circuit path for any reactive load current. An output filter is preferably employed to remove most of the high frequency component from the alternating positive and negative voltage steps that are provided to the standby power system output terminals.

The power conversion system of the present invention draws less rms current from the system battery than previously known designs employing high frequency fly-back type transformers. This eliminates the need for a large electrolytic capacitor across the system battery, thereby reducing system cost and weight. Elimination of the large electrolytic capacitor from across the system battery also reduces the likelihood of sparking or arcing when the system battery is replaced. The reduction in rms current drawn from the battery also reduces the volt-amp rating requirements, and therefore the cost, of the high frequency switching devices that are used to connect the system battery to the high frequency transformer. The power conversion system of the present invention does not require an intermediate DC storage capacitor to be used between the high frequency transformer and the line frequency inverter switching devices. Thus, the use of another large electrolytic capacitor found in previous designs is avoided. Moreover, the power conversion system of the present invention employs only two, rather than four, line frequency inverter switching devices, thereby reducing the cost of a standby power system in accordance with the present invention even further.

In accordance with the present invention, the power conversion system of the standby power system is preferably controlled to provide a stable rms output voltage level in the presence of reasonable variations in load characteristics and battery voltage levels. The standby power system is also preferably controlled to limit the peak output voltage level. Rms and peak output voltage control is provided by the system controller based on a single digital voltage control signal derived from the output voltage of the standby power system. The standby power system controller employs the voltage control signal to maintain the desired rms output voltage level by controlling the inverter switching devices to vary the durations of the output voltage steps and the zero-voltage dead times between output voltage steps.

The output voltage control signal is preferably provided by an RC integration circuit and a piece-wise approximation modification to the integration circuit, consisting of series connected back-to-back zener diodes and a resistor, that are connected across the standby power system output terminals. The rectified output of this circuit is used to provide a control signal to maintain the rms output voltage level nearly constant. When the rectified output of the rms output voltage detection circuit exceeds a threshold level, established, e.g., using a zener diode, the output voltage control signal is provided, e.g., via an opto-coupler, to the standby power system controller. In response to the appearance of the output voltage control signal, the system controller turns the high frequency switching devices off, and turns on both line frequency inverter switching devices to thereby terminate an output voltage step and initiate the zero-voltage dead time. If, however, the output voltage control signal appears within, e.g., the first three milliseconds of the beginning of an output voltage step, the system controller preferably adjusts the pulse width of the high frequency modulation of the high frequency switching devices, rather than terminating the line frequency voltage step.

Peak output voltage control is preferably provided to limit the peak output voltage of the standby power system. Peak output voltage control preferably overrides the action of the rms output voltage control mechanism in some situations. Peak output voltage control in accordance with the present invention provides a fast response if the peak voltage across the standby power system output terminals becomes excessive. Peak output voltage sensing is provided using voltage dividing varistors (MOVs) connected across the standby power system output terminals in parallel with the rms output voltage detection circuit. If the peak output voltage across the standby power system output terminals becomes excessive, the output voltage level is quickly clamped by the MOVs. The voltage across a portion of the voltage divider circuit formed by the MOVs is also rectified and applied across a zener diode. When the peak output voltage level becomes excessive, the zener diode conducts, and the output voltage control signal is delivered to the system controller, via the opto-coupler. The system controller responds to the appearance of the output voltage control signal by terminating an output voltage step to thereby initiate a zero-voltage dead time. A standby power system in accordance with the present invention thus provides rms and peak output voltage control based on a single isolated digital signal, the output voltage control signal, and employs a simple control algorithm. The need for conventional analog-to-digital conversion of the output voltage waveform is, therefore, avoided, and a low-cost microprocessor can be used to implement the system controller.

Line fault detection in accordance with the present invention is preferably performed by the system controller based on a single isolated digital line sense signal. The line sense signal is preferably provided by voltage dividing and rectifying the input voltage waveform on the input terminals of the standby power system. If the instantaneous rectified input voltage level exceeds a line sense threshold level, established, e.g., using a zener diode, the line sense signal is delivered, e.g., via an opto-coupler, to the system controller. The system controller may employ various algorithms to determine whether or not main AC line power is present based on the single line sense signal.

A preferred line fault detection algorithm based on the line sense signal employs two checks, an "integral check" and a "peak check". The integral check involves determining the duration of a portion of the half-cycle of the input voltage waveform during which the input voltage waveform is below the line sense threshold voltage level. The line sense signal is periodically polled during each half-cycle of the input voltage waveform. If the amount of time during the half-cycle that the line sense control signal is inactive is more than a line-loss threshold time, the standby power system controller indicates the detection of a line fault, and initiates a transfer from providing line power to the load to providing backup power to the load from the system battery. The peak check occurs near the peak of each half-cycle (i.e., near 90° and 270°). The line sense signal is polled at this time. If the line sense signal is inactive, the system controller indicates the detection of a line fault, and transfer to backup power operation is initiated. The peak check is used to decrease the maximum transfer time from line to backup operation in case of a total line loss near the midpoint of a half-cycle. Noise immunity is gained by taking multiple samples of the line sense signal around the peak point of each half-cycle.

The integral check algorithm is also preferably used to determine the return of an AC input voltage waveform. While the standby power system is providing backup power to the load, the line sense signal is monitored. If the duration of a portion of a half-cycle during which the line sense signal is active exceeds a line-return threshold time, the standby power system controller indicates that main AC power has returned, and a transfer from backup to line power is initiated. This preferred line fault detection algorithm allows the transfer to backup power from line power, and back again, to be initiated at any selected rms input voltage level by changing the line-fault and line-return threshold times. Brownout voltage hysteresis is accomplished using a different threshold time for transition from backup to line power (line-return threshold time) than for transition from line to backup power (line-loss threshold time). The preferred line fault detection algorithm offers good noise immunity and reduces the effect of controller resolution on the determination of line-loss.

An alternative algorithm for line fault detection involves polling of the line sense signal at certain phase angles during each half-cycle of the input voltage waveform. As the line voltage varies, the phase angle at which the line sense signal becomes active and inactive also varies. By polling the line sense signal at certain phase angles, the standby power system controller can determine if certain line voltage limits are being met. If, during the first half of an input voltage waveform half-cycle, the line sense signal is found to be inactive when polled at a time corresponding to a selected line-loss phase angle from the beginning of the half-cycle, a line fault detection is indicated. (The line-loss phase angle is selected such that, under normal operating conditions, the input voltage waveform should have exceeded the line sense detection level, thereby activating the line sense signal, at this point in time.) Similarly, if, during the second half of the half-cycle, the line sense signal is inactive at a time corresponding to 180° minus the selected line-loss phase angle from the beginning of the half-cycle, a line fault detection is indicated. The line-loss phase angle can be varied to change the approximate voltage limit of line fault detection. Different phase angles are preferably used for determining the occurrence of a line fault (line-loss phase angle), and for determining the return of AC line power (line-return phase angle), to provide hysteresis. Detection of a line fault by this method is preferably corroborated by multiple polls of the line sense signal within, e.g., 100 microseconds of the selected line-loss phase angle, before any action is taken. Detection of nominal line return is preferably corroborated by at least two additional line cycle tests before any action is taken. Line fault detection using this method is preferably suspended when zero-cross deviations occur, making accurate phase angle calculations for polling of the line sense signal impossible. Consecutive zero-cross deviations preferably result in the indication of a line fault detection, and the initiation of a transfer to backup power.

Further objects, features, and advantages of the invention will be apparent from the following detailed description when taken in conjunction with the accompanying drawings.

DETAILED DESCRIPTION OF THE INVENTION

Figure 1:
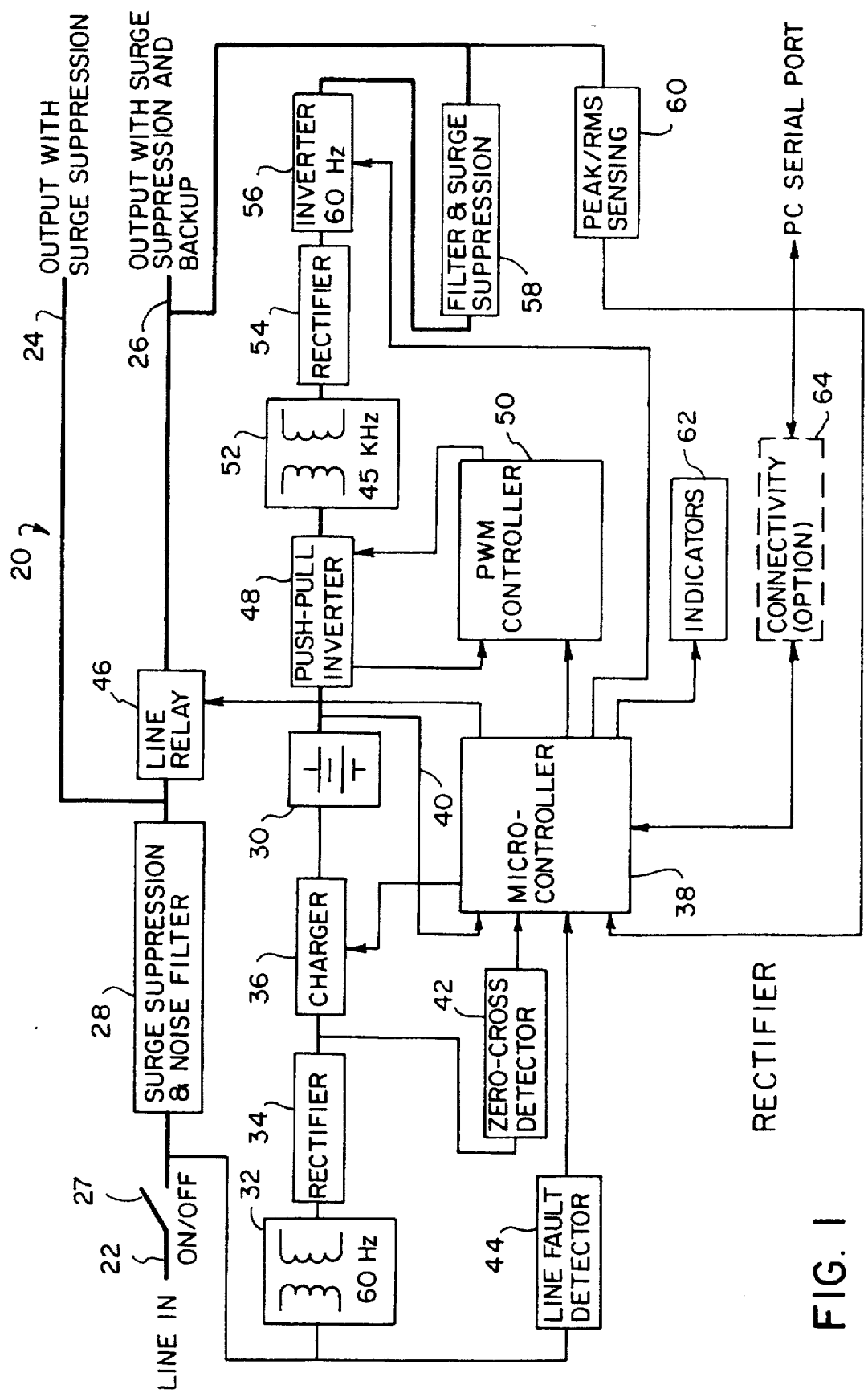
FIG. 1 is a block diagram of a standby power system in accordance with the present invention.

With reference to the drawings, a block diagram of a standby power system in accordance with the present invention is shown generally at 20 in FIG. 1. In operation, the standby power system 20 will be connected to receive power from a main AC power system (line power) at its input terminals 22. A load, such as a computer system, may be connected to the output terminals 24 or 26 of the standby power system 20. A mechanical switch 27 may be provided which, when closed, activates the standby power system 20 to provide power from the input terminals 22 through the standby power system 20 to a load connected to the output terminals 24 or 26. Line power conditioning is preferably provided by a surge suppression and noise filter 28 that is placed between the input terminals 22 and both output terminals 24 and 26 of the standby power system 20. The surge suppression and noise filter 28 preferably includes passive circuit components combined in a conventional manner to filter transient spikes and other noise from the line signal. A load connected to output terminals 24 of the standby power system 20 is thus protected by the surge suppression and noise filter 28 from certain distorted power waveforms on the AC power system that might disturb the operation of the load. However, should line power fail, a load connected to output terminals 24 of the standby power system 20 will be deprived of power and forced to shut down. However, a load connected to output terminals 26 of the standby power system 20 will be supplied with filtered AC line power when the AC line power is active, and with backup power from the standby power system 20 should main AC power fail. Thus, a critical load, such as a computer system, wherein a loss of line power could result in the interruption of programs and the loss of valuable data or a system malfunction, is preferably connected to the output terminals 26 of the standby power system 20. The operation of the standby power system 20 to provide backup power to a critical load connected to output terminals 26 of the standby power system 20 when main AC power fails will now be described.

Backup power for a critical load connected to output terminals 26 of the standby power system 20 is provided from a standby power system battery 30. During periods when main AC power is available on the input terminals 22 of the standby power system 20 the battery 30 may be charged. Energy for charging the battery 30 is provided by a transformer 32 connected across the input terminals 22. The transformer reduces the voltage level of the low frequency, e.g., 60 Hz, input voltage signal to a lower voltage level suitable for charging the battery 30. A rectifier 34 connected to the transformer 32 provides a DC power signal to a battery charger 36 from the line frequency AC signal provided by the transformer 32. The transformer 32, rectifier 34, and battery charger 36 may all be implemented in a conventional manner. The battery charger 36 is controlled by the standby power system controller 38, which may be implemented using a conventional microprocessor. The system controller 38 controls the battery charger 36 to ensure that the battery 30 is fully charged, but is not overcharged, during the period when main AC power is available. The system controller 38 monitors the battery voltage, via a line 40, to ensure that the battery voltage is brought up to, but does not exceed, the fully charged voltage level.

The rectified line signal provided by the rectifier 34 is also provided to a zero-cross detector 42. The zero-cross detector 42 may be implemented in various conventional manners to provide a signal to the system controller 38 when a zero-cross of the main AC power line signal is detected. As will be discussed in more detail below, the zero-cross detection signal is employed for line fault detection, among other purposes.

A line fault detection system 44 is preferably connected to the input terminals 22 of the standby power system 20. As will be described in more detail below, the line fault detection system 44 preferably provides a line sense signal to the system controller 38 whenever the instantaneous line voltage level exceeds a selected line sense threshold level. The system controller 38 employs the line sense signal to determine whether a line fault is indicated. If a line fault is indicated, i.e., if the AC power provided on the input terminals 22 of the standby power system 20 can no longer support a critical load connected to output terminals 26 of the standby power system 20, the controller 38 initiates a transition from providing line power to the load to providing backup power from the system battery 30 to the load.

In response to an indication of the detection of a line fault, the system controller 38 preferably opens a line relay 46 connected between the input terminals 22 and output terminals 26 of the standby power system 20. The opening of the line relay 46 isolates the output terminals 26 from the input terminals 22 of the standby power system 20. This prevents the backup power that will be provided to the output terminals 26 from the battery 30 from feeding back through the input terminals 22 to a dead AC power system. Simultaneous with opening the line relay 46, the system controller 38 begins operation of a power conversion system for providing backup AC power at line frequency and line voltage levels from the battery 30 to a load connected to the output terminals 26 of the standby power system 20.

The main components of a power conversion system in accordance with the present invention for providing AC power at line frequency and line voltage levels to a load from the battery voltage 30 include: a push-pull inverter 48, which includes high frequency switching devices that are controlled by a PWM controller (modulator) 50, a high frequency transformer 52, a diode bridge rectifier 54, and a line frequency inverter 56 including two line frequency switching devices. Operation of the modulator 50 and line frequency inverter 56 is controlled by the system controller 38 in a manner to be described in more detail below to provide a line frequency stepped square wave output voltage waveform at line voltage levels on the output terminals 26 of the standby power system 20. Note that, although shown as separate components in FIG. 1, the modulator 50 and system controller 38 may be implemented using a single integrated circuit device, or multiple devices. Use of a single integrated device to effect both high frequency and low frequency control functions would, however, increase system costs. Preferably, a commercially available integrated circuit modulator 50 may be employed (such as the UC3525, which also provides voltage regulator, gate driver, microprocessor signal interface, and power switching device protection functions). The stepped square wave output voltage waveform provided by the power conversion circuit is filtered by a conventional passive filter and surge suppression circuit 58 before being provided to the load connected to output terminals 26.

An rms/peak output voltage sensing system 60 is preferably connected to the output terminals 26 of the standby power system 20. As will be discussed in more detail below, the rms/peak output voltage sensing system 60 provides an output voltage control signal to the system controller 38 when either the rms output voltage level provided by the power conversion system exceeds a selected rms output voltage level threshold or the peak instantaneous output voltage level across the output terminals 26 exceeds a selected peak output voltage level threshold. As will also be discussed in more detail below, the system controller 38 employs the output voltage control signal provided by the rms/peak output voltage sensing system 60 to control the power conversion system to regulate the output voltage level of the standby power system 20 to a desired steady-state rms voltage level, and to prevent the peak voltage level across the output terminals 26 from exceeding a maximum peak output voltage level.

A standby power system 20 in accordance with the present invention may also include various user interface systems that allow a system operator to monitor the operation of the standby power system 20. Such user interface systems may include visual or audible indicators 62, e.g., LEDs, which may be controlled by the system controller 38 to provide an indication of, e.g., whether the standby power system 20 is providing line or backup power to a load, whether the battery 30 has become discharged below an operational voltage level, etc. The user interface system may also provide for optional connectivity 64 between the system controller 38 and an external computer system. Two-way connectivity may be provided between the system controller and a personal computer via, e.g., the serial port of the personal computer. The system controller 38 may provide standby power system operating condition information in a textual or other form to a system operator through the connectivity system 64. A system operator may also be allowed to adjust certain standby power system operating parameters stored in the system controller 38 via the connectivity system 64. The user interface indicators 62 and connectivity system 64 may be implemented in a variety of conventional manners to provide the level of operational monitoring, diagnosis, and control of the standby power system 20 that is desired.

Figure 2:
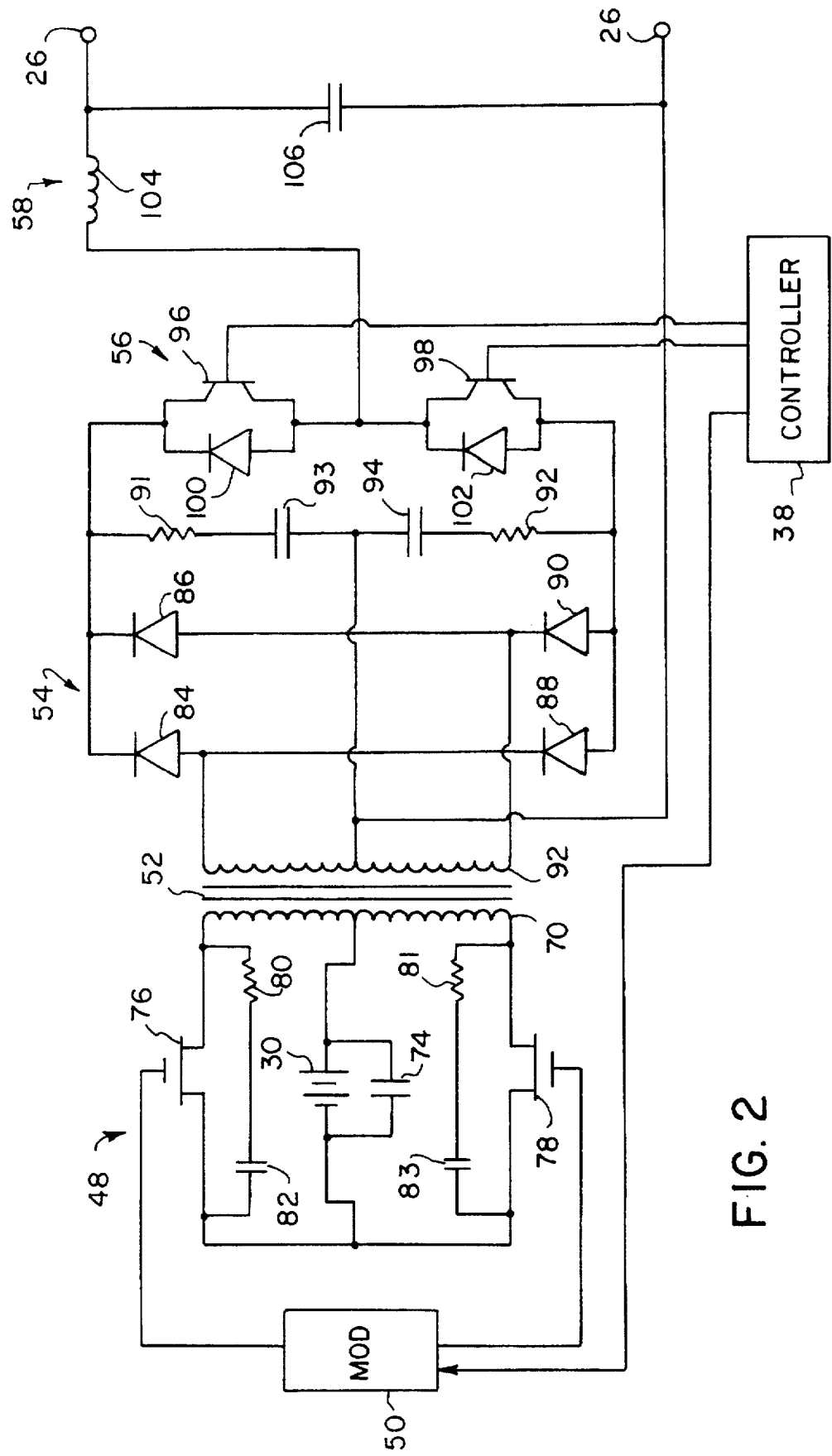
FIG. 2 is a schematic circuit diagram of a power conversion system for a standby power system in accordance with the present invention.

An exemplary embodiment of a power conversion system for a standby power system 20 in accordance with the present invention is described in detail with reference to the schematic circuit diagram of FIG. 2. The power conversion system converts a relatively low DC battery voltage to a line frequency stepped square wave output signal at line voltage levels. The stepped square wave output signal includes positive and negative voltage steps having magnitudes corresponding to approximately the normal peak AC voltage level that would be provided to the load by the main AC power system. The positive and negative voltage steps are separated by zero-voltage dead times whose durations are adjusted to regulate the rms output voltage level of the standby power system 20.

The positive terminal of the system battery 30 is connected to a center tap on the primary winding 70 of the high frequency transformer 52. A filter capacitor 74 is preferably connected across the terminals of the battery 30. Since the power conversion system of the present invention will not draw large rms currents from the battery 30, a relatively small and lightweight filter capacitor 74 may be used. Use of a small capacitor 74 reduces system cost and weight and also limits the potential for sparking or arcing across the capacitor 74 when the system battery 30 is removed. The negative terminal of the battery 30 is connected via high frequency switching devices 76 and 78 to opposite ends of the primary winding 70 of the transformer 72. The high frequency switching devices 76 and 78 may be implemented, for example, using MOSFETs. The low rms current draw of a power conversion system in accordance with the present invention means that relatively low volt-amp rated high frequency switching devices 76 and 78 may be used. Snubbers, consisting of resistors 80 and 81 and capacitors 82 and 83, may preferably be connected across the high frequency switching devices 76 and 78. The high frequency switching devices 76 and 78 are responsive to high frequency switching control signals provided by the modulator 50 to connect the system battery voltage in opposite polarities to the primary winding 70 of the transformer 52. The high frequency switching devices 76 and 78, in combination with the transformer 52, form a high frequency push-pull inverter 48 to convert the relatively low battery voltage to the required peak line output voltage level. Although only two MOSFETs 76 and 78 are illustrated in FIG. 2, it should be understood that multiple paralleled high frequency switching devices 76 and 78 may be employed to increase the current handling capability of the push-pull inverter 48. The use of the high frequency transformer 52 reduces total system cost and weight.

The rectifier bridge 54, formed of diodes 84, 86, 88 and 90, is connected across the secondary winding 92 of the transformer 52. Secondary snubbers, including resistors 91 and 92 and capacitors 93 and 94, are preferably connected across the rectifier bridge 54. The line frequency inverter 56 is connected across the output of the diode bridge rectifier 54. The line frequency inverter includes two line frequency power switching devices 96 and 98, e.g., IGBTs, with anti-parallel connected diodes 100 and 102, respectively. The line frequency switching devices 96 and 98 are responsive to line frequency switching control signals provided by the system controller 38 to connect the voltage across the output of the rectifier 54 in opposite polarities to the system output terminals 26. The output filter 58, to filter high frequency components from the output signal, is provided by an inductor 104 connected in series between the line frequency inverter 56 and the output terminals 26, and a filter capacitor 106 connected across the output terminals 26.

Figure 3:
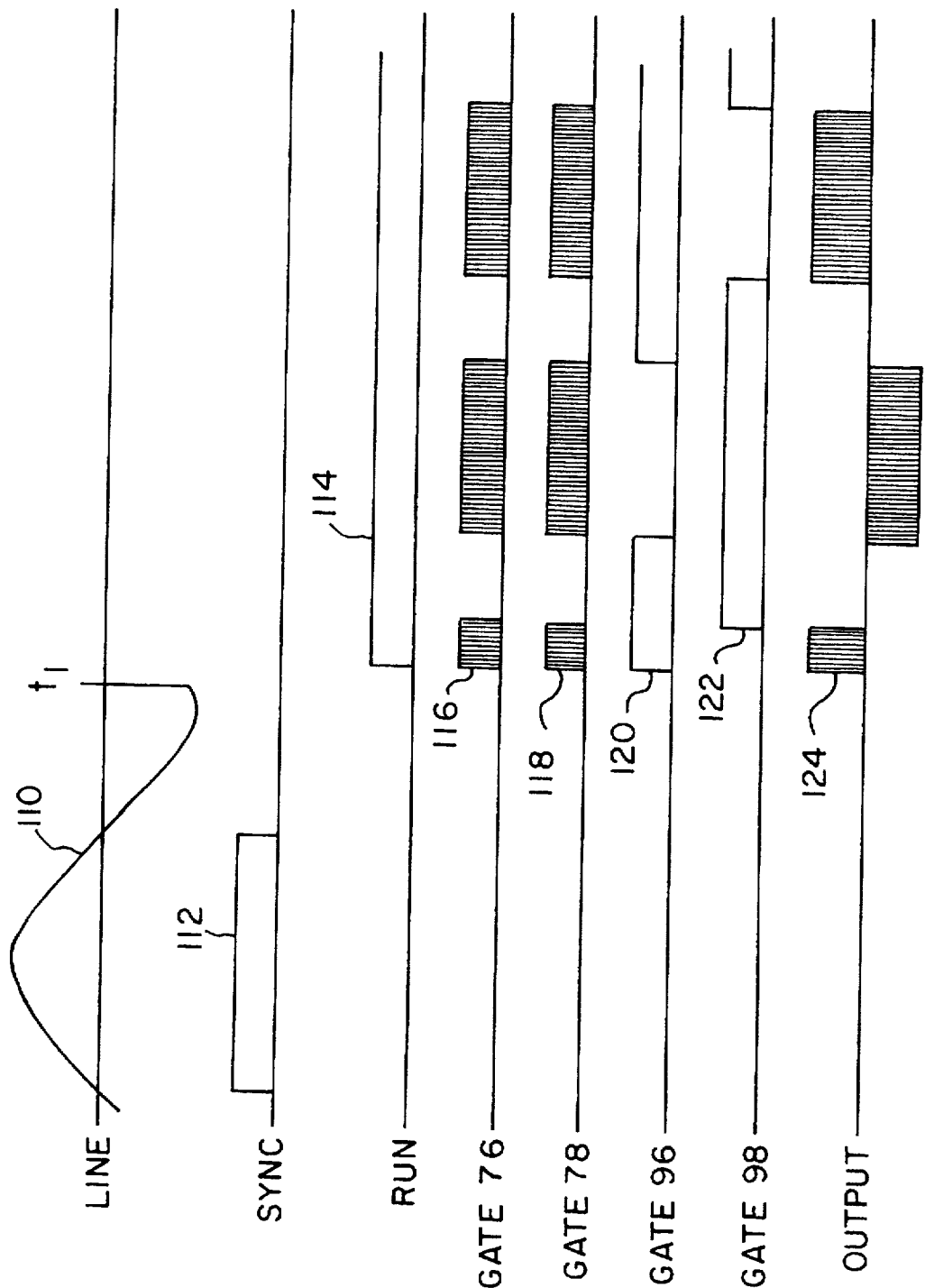
FIG. 3 is a waveform diagram illustrating operation of the power conversion system of FIG. 2.

Operation of the power conversion system illustrated in FIG. 2 to provide a stepped square wave output voltage signal on the output terminals 26 at line frequency and line voltage levels will now be described with further reference to the waveform diagram of FIG. 3. Prior to the occurrence of a line fault, the AC line signal 110 is provided from the standby power system input terminals 22 to the system controller 38. From the AC line waveform 110, a synchronization signal 112 is generated by the system controller 38. This synchronization signal 112 will be used by the controller 38 to provide a stepped square wave output voltage waveform at the line frequency, which is synchronous in phase with the AC line signal, during backup power operation of the standby power system 20. When failure of the AC power line occurs, at time $t_1$, the system controller 38 provides a signal to open the line relay 46 and provides a run signal 114 to the modulator 50 to initiate operation thereof.

While the run signal 114 is active, the modulator 150 provides high frequency switching signals 116 and 118 to the high frequency switching devices 76 and 78. The high frequency switching devices 76 and 78 are turned on and off alternately by the modulator 50 at a high frequency of, e.g., 45 kHz. As the switching devices 76 and 78 are alternately switched into their conducting states, the battery 30 is connected in alternating polarities to the primary winding 70 of the transformer 52. High frequency switching of the inverter switching devices 76 and 78 thus provides high frequency pulses on an alternating basis between the ends of the primary winding 70, at the battery voltage level, causing high frequency positive and negative voltage pulses at approximately the line voltage level to appear on the secondary winding of the transformer 52. High frequency switching of the high frequency switching devices 76 and 78 is not constant, however. The high frequency switching signals are periodically interrupted by adjustable duration dead times at a rate of twice line frequency. This results in bursts of high frequency pulses, modulated at, e.g., 120 Hz for 60 Hz applications, being applied to the primary winding 70 of the transformer 52 and appearing on the secondary winding 92 of the transformer 52.

The high frequency positive and negative pulse bursts appearing on the secondary winding 92 of the transformer 52 are rectified by the diode bridge rectifier 54. The resulting rectified power signal is a chain of high frequency, e.g., 90 kHz, pulse bursts separated by low frequency, e.g., 120 Hz, variable duration dead times. The snubber resistors 91 and 92, and capacitors 93 and 94, remove high-frequency noise artifacts from the rectified waveform.

The line frequency switching devices 96 and 98 have two functions. First, the switching devices 96 and 98 are controlled to provide a line frequency stepped square wave output voltage waveform from the pulse bursts appearing at the output of the rectifier 54. The line frequency switching devices 96 and 98 are also controlled to ensure that a zero-voltage dead time is maintained between the pulse bursts. This is accomplished by turning on both switching devices 96 and 98 such that both switching devices 96 and 98 conduct simultaneously during the dead times. Thus, during the zero-voltage dead times, the output terminals 26 of the standby power system 20 are short circuited through the switching devices 96 and 98, the diode bridge 54, and the high frequency transformer secondary 92, for both directions of current flow.

The line frequency switching devices 96 and 98 are turned on by line frequency switching signals 120 and 122 provided by the system controller 38. The line frequency switching devices 96 and 98 are controlled such that, for example, line frequency switching device 96 is turned on to provide a positive high frequency pulse burst, corresponding to a high frequency pulse burst on the output of the rectifier 54, to the output terminals 26. Similarly, line frequency switching device 98 is turned on to provide a negative high frequency pulse burst, also corresponding to a high frequency pulse burst on the output of the rectifier 54, to the output terminals 26. The positive and negative high frequency pulse bursts provided to the output terminals 26 are separated by zero-voltage dead times, during which both line frequency switching devices 96 and 98 are turned on, corresponding to the dead times on the secondary winding 92 of the transformer 52. Thus, a stepped square wave output voltage waveform 124 is provided to the output terminals 26 of the standby power system 20. The voltage steps of the stepped square wave output signal 124 correspond to the high frequency pulse bursts on the secondary winding 92 of the transformer 52. Most of the high frequency, e.g., 90 kHz, ripple from the, e.g., 60 Hz, stepped square wave output signal is filtered by the output filter inductor 104 and capacitor 106.

The power conversion system of the present invention provides several significant cost reduction advantages over power conversion systems used in previous standby power systems. The single, light weight, low cost, high frequency transformer 52 is less expensive than the heavy low frequency transformers that are used in some other standby power systems. The rms current drawn from the system battery 30 by the power conversion system of the present invention is less than that which is drawn from the battery by a power conversion system that employs a high frequency fly-back type converter design. This reduces the need for a large electrolytic capacitor across the battery 30, thereby both reducing system cost and weight as well as the danger of sparking/arcing across the capacitor when the system battery is changed. The volt-amp rating requirement of the high frequency switching devices 76 and 78 is one-half of that which would be required by a fly-back type power conversion system. In the present invention, no intermediate DC filter is used between the transformer 52 and the line frequency inverter 56. Thus, another large electrolytic capacitor used in previous designs is avoided. In the present invention, the line frequency inverter 56 employs only two switching devices, as opposed to the four-switch bridges used in some other systems. In systems that employ a fly-back inverter to boost battery voltage, the high frequency transformer is driven in only one direction of flux. Therefore, the transformer reactance has to be larger than that required by the present invention, wherein the transformer is driven in both directions.

The stepped square wave output signal provided by the power conversion system of the present invention is preferably regulated to provide a stable rms output voltage level for all reasonable battery voltage and load conditions. The rms output voltage level must preferably be maintained for a variety of computer and peripheral loads, as seen by the input characteristics of the load power supplies. Hence, a certain range of power factors must be accommodated.

In accordance with the present invention, regulation of the rms output voltage level of the standby power system 20 in response to changing load and/or changing nominal battery voltage conditions is implemented by varying the duration of the voltage steps and the zero-voltage dead times between the voltage steps of the stepped square wave output voltage waveform. Output voltage regulation is preferably provided by the system controller 38 based on a single isolated digital output voltage control signal. The system controller 38 responds to the output voltage control signal by terminating an output voltage step, to thereby adjust the zero-voltage dead time between voltage steps, to regulate the output voltage level.

Figure 4:
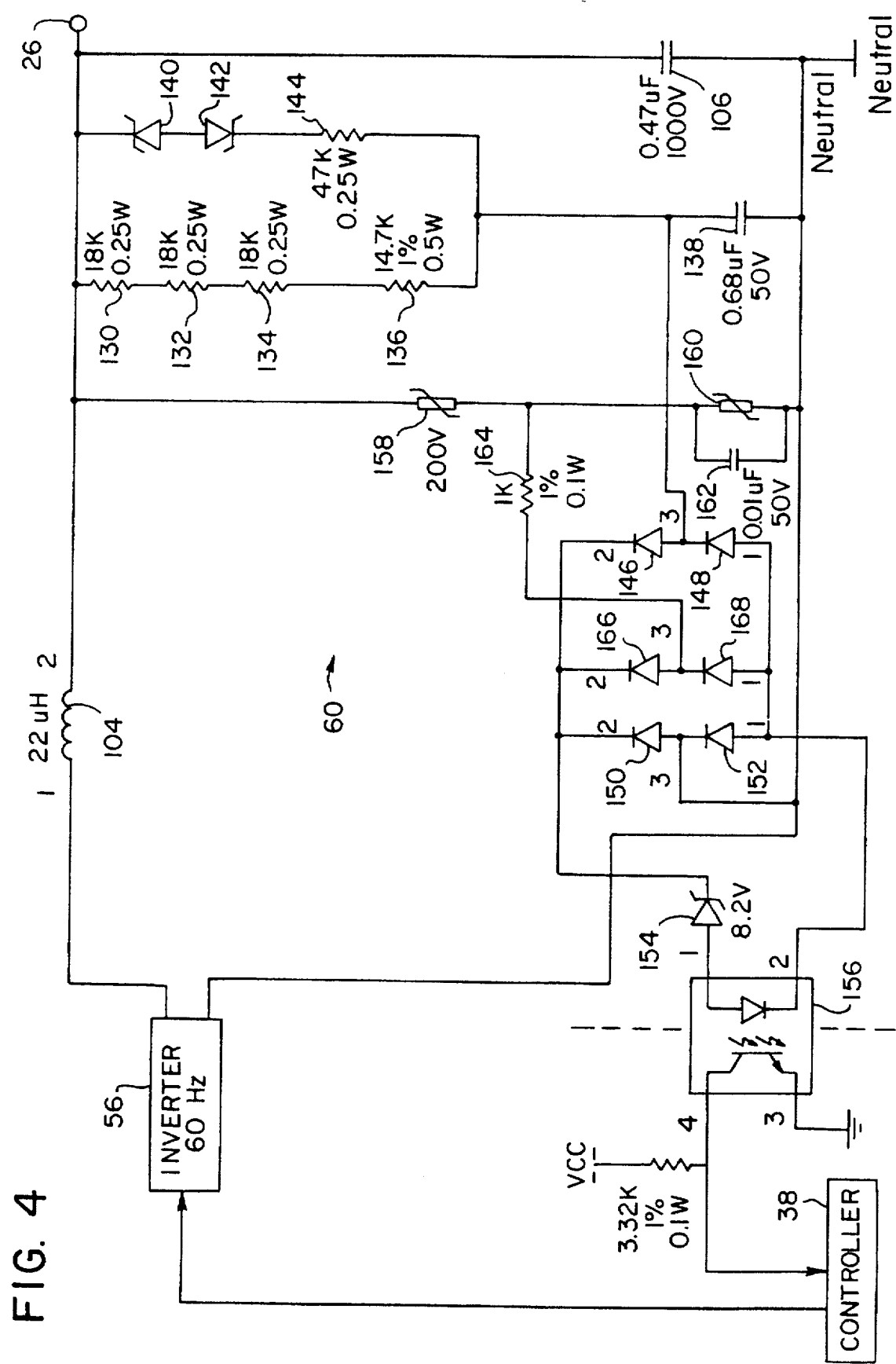
FIG. 4 is a schematic circuit diagram of an rms and peak output voltage control system for a standby power system in accordance with the present invention.

A preferred circuit for providing the output voltage control signal is illustrated in and described with reference to FIG. 4. The output voltage control signal is preferably provided when either the rms output voltage level of the standby power system 20 exceeds an rms output voltage threshold or the peak output voltage level across the output terminals 26 exceeds a peak output voltage threshold. An RC integration circuit, including resistors 130, 132, 134, and 136, and capacitor 138, is connected across the standby power system output terminals 26. A piece-wise approximation modification to the integration circuit, including series connected back-to-back zener diodes 140 and 142 and a resistor 144, is connected in parallel with the resistors 130, 132, 134, and 136 and in series with the capacitor 138. The combined effect of the RC integration and piece-wise approximation circuits is to provide a peak voltage level across the capacitor 138 that corresponds to the rms output voltage level across the standby power system output terminals 26. If the zener diodes 140 and 142 and the resistor 144 were not in the circuit, the voltage level across the capacitor 138 would correspond to the average output voltage, rather than the rms output voltage, of the standby power system. In such a case, the system controller 38 would provide average voltage, versus rms voltage, regulation. However, by adding the piece-wise approximation modification consisting of zener diodes 140 and 142 and resistor 144, a non-linear component is provided to charge the capacitor 138, to thereby provide an approximation of the rms output voltage level. Note that the combination of the resistors 130, 132, 134, 136, and 144, and zener diodes 140 and 142 acts as a single non-linear resistor.

The peak voltage level across the capacitor 138, corresponding to the rms output voltage of the standby power system 20, is rectified by a diode bridge including diodes 146, 148, 150, and 152. The resulting rectified rms output voltage level signal is applied across a control signal zener diode 154. When the threshold voltage level of the zener diode 154 is reached, the zener diode 154 conducts through opto-coupler 156, which provides a signal to the system controller 38. This is the output voltage control signal. The controller 38 responds to the output voltage control signal by controlling the line frequency inverter 56 and the modulator 50 to terminate an output voltage step, and thereby initiate a zero-voltage dead time. Thus, an output voltage step is terminated when the occurrence of the output voltage control signal indicates that the rms output voltage level of the standby power system 20 has reached the rms output voltage level threshold. In this manner, the system controller 38 provides rms output voltage control based on a single digital signal.

The output voltage control signal is also used by the controller 38 to provide peak voltage control of the standby power system output voltage waveform. Peak voltage control preferably overrides the action of the rms output voltage control mechanism. Fast-response peak voltage control may be required for abnormally high battery voltage conditions, or by abnormally low displacement power factors of loads that are connected to the standby power system output terminals 26. An abnormally low displacement power factor of the load could cause out of phase currents to flow longer than the allotted dead times. When the dead time is terminated, resulting in a loss of current path, a pumping up of the output voltage could occur. To avoid this, the peak output voltage control mechanism cuts back the output voltage accordingly by immediately clamping the output voltage level if it becomes excessive and by initiating a zero-voltage dead time on the output terminals 26.

Peak voltage sensing is provided by metal oxide varistors (MOVs) 158 and 160 connected in series across the standby power system output terminals 26 to provide a voltage divider. A voltage divider. A capacitor 162 is connected across one of the MOVs 160. If the peak voltage across the output terminals 26 of the standby power system 20 becomes excessive, the MOVs 158 and 160 will conduct to clamp immediately the output voltage to a safe maximum level. Simultaneously, the voltage across MOV 160 and capacitor 162 will be applied through resistor 164 and a rectifier bridge including diodes 150, 152, 166, and 168, to the control signal zener diode 154. The resistance values of the voltage divider MOVs 158 and 160 are selected such that the rectified voltage from across capacitor 162 will cause the control signal zener diode 154 to conduct, and the output voltage control signal to be provided via the opto-coupler 156 to the system controller 38, when the instantaneous voltage level across the output terminals 26 exceeds a peak output voltage threshold. As described previously, the appearance of the output voltage control signal will cause the controller 38 to terminate an output voltage step, thereby initiating a zero-voltage dead time on the output terminals 26.

As described, the controller 38 preferably responds to the output voltage control signal by terminating an output voltage step, to thereby adjust the duration of the zero-voltage dead time between output voltage steps. However, if the output voltage control signal appears soon after the initiation of an output voltage step, e.g., within 3 milliseconds of the beginning of a voltage step, the controller 38 may preferably ignore the output voltage control signal, and, instead, the modulator 50 may respond to the signal by folding back the pulse width of the high frequency pulse bursts, by adjusting the high frequency switching signals provided by the high frequency pulse width modulator 50, rather than by terminating the line frequency voltage step. This pulse width modulation of the high frequency pulse bursts will be effective for reducing the rms output voltage level of the standby power system 20 in response to rapidly changing operating conditions. In most cases, however, the main mechanism for regulating the output voltage level will be by adjustment of the duration of the voltage steps and of the zero-voltage dead times between the stepped square wave voltage steps. Thus, during most of the period of operation of the standby power system 20 to provide backup power to the load, the modulator 50 will provide high frequency modulation with a constant pulse width.

In accordance with the present invention, both rms and peak output voltage control is provided based on a single digital output voltage control signal that is provided to the system controller 38. Since conventional analog-to-digital conversion of the output voltage waveform and complex control algorithms are not required, a low cost microprocessor may be used to implement the controller 38. output voltage control circuit isolation, i.e., isolation between the high AC voltage levels provided at the output terminals 26 of the standby power system and the low voltage levels at which the controller 38 operates, is maintained by the use of the opto-coupler 156.

Figure 5:
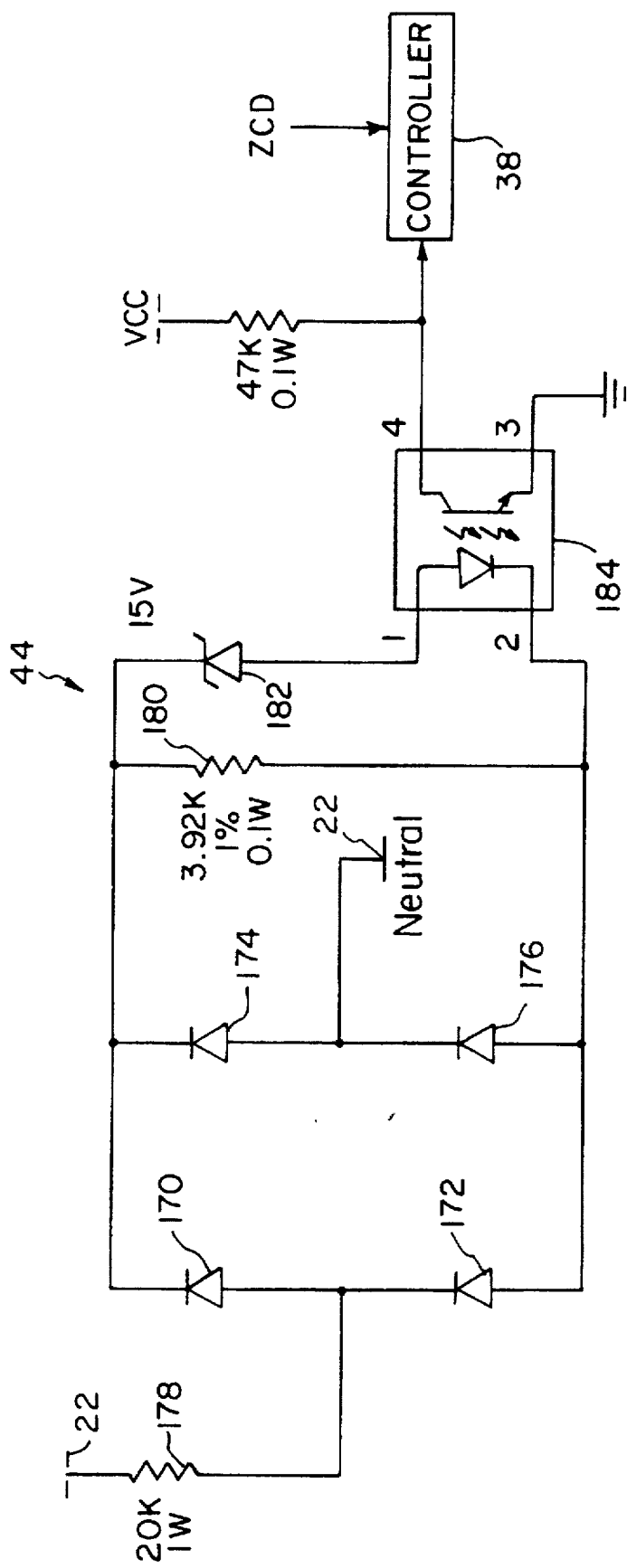
FIG. 5 is a schematic circuit diagram of a line fault detection system for a standby power system in accordance with the present invention.

A preferred line fault detection system 44 for a standby power system 20 in accordance with the present invention is illustrated in and described with reference to FIG. 5. The line fault detection system 44 provides a line sense signal to the system controller 38 when the voltage level at the input terminals 22 of the standby power system 20 exceeds a selected line sense voltage threshold level. The line sense signal is employed by the system controller 38, along with a zero-cross detection signal provided by zero-cross detector 42, to determine the occurrence of a line fault, indicating the need to initiate a transfer from providing line power to a load to providing backup power from the battery 30 to the load, and to determine whether AC line power has returned, indicating that conditions are right for initiating transfer from backup power back to line power.

The line fault detection system 44 includes a diode bridge rectifier, including diodes 170, 172, 174, and 176, connected across the input terminals 22 of the standby power system 20. Resistors 178 and 180 form a voltage divider that scales the rectified line voltage provided by the rectifier. The scaled and rectified line voltage is applied across a line sense zener diode 182. When the scaled down voltage from across the input terminals 22 of the standby power system 20 exceeds the threshold voltage level of the line sense zener diode 182, the zener diode 182 conducts, and a signal is provided, via opto-coupler 184, to the system controller 38. This signal is the line sense signal, which indicates that the instantaneous absolute value of the voltage across the input terminals 22 of the standby power system exceeds a selected line sense voltage threshold that is established by the breakdown voltage of zener diode 182 and the voltage dividing resistors 178 and 180.

The line sense signal may be employed by the system controller 38 in the performance of various line-loss and line-return detection algorithms to determine the occurrence of line faults as well as the return of normal AC line voltage levels. A preferred line-loss/line-return detection algorithm that may be implemented by the system controller 38, and which employs the line sense signal, will now be described.

The preferred line fault detection algorithm assumes that the line fault detection system 44 provides a line sense signal to the controller 38 that is active whenever the instantaneous absolute voltage level of the AC line input signal is greater than a pre-determined line sense threshold level, and inactive otherwise. Note that the terms inactive and active are used in a relative sense. Thus, for example, an "active" line sense signal may be at either a high or low logic voltage level, with the "inactive" signal at a complementary level. This algorithm also assumes a constant line sense threshold level throughout the entire 360° of the sine wave input signal.

The preferred line fault detection algorithm performs two different checks, an integral check, and a peak check. If either check indicates a failure of main AC line power, a line fault is indicated as being detected, and the controller 38 initiates a transfer from providing line power to providing backup power from the system battery 30 to the load.

The integral check is performed by determining the duration of a portion of the AC line signal half-cycle during which the instantaneous absolute input voltage level is below the line sense threshold level. The controller 38 implements the integral check by sampling the line sense signal periodically, e.g., 20 times, during each half-cycle of the input AC voltage waveform. The duration of the portion of the half-cycle during which the line sense detection signal is inactive is thereby determined. If this duration exceeds a predetermined line-loss threshold time, a line fault detection is indicated, and a transfer from line to backup power is initiated by the system controller 38, by opening the line relay 46, and by activating the power conversion system to provide backup power from the battery 30 to the load.

A general formula for establishing the line-loss threshold time is:

$$t_{threshold} = \frac{2}{\omega} \times \left( \arcsin \left( \frac{\sqrt{2} \times V_{breakpoint}}{2 \times V_{LoRMS}} \right) \right) \quad (1)$$

where $t_{threshold}$=line-loss threshold time;

$\omega$=line frequency in radians;

$V_{breakpoint}$=line sense threshold voltage level above which the line sense signal is active; and $V_{LoRMS}$=selected RMS voltage level below which a line fault is to be indicated.

The input voltage level at which a line fault detection is to be indicated, and transition from line power to backup power initiated, may be established at any given rms value of the input voltage by selecting the appropriate line-loss threshold time. This line fault detection algorithm offers good noise immunity, and reduces the effect of controller resolution on the determination of line-loss.

The peak check occurs near the peak of each half-cycle (i.e., near 90° and 270°) of the AC line signal. The zero-cross detection signal provided to the system controller 38 by the zero-cross detector 42 is used to determine a point in time corresponding to the half-cycle peak. The time of occurrence of a half-cycle peak may, for example, be determined as one-half of the time between the last two previous zero-cross detections following the last previous zero-cross detection. The line sense signal is polled at this time corresponding to the half-cycle peak. If the line sense signal is inactive at this time, a line fault detection is indicated, and the controller 38 initiates a transfer from line to backup power. The peak check is employed to decrease the maximum transfer time from line to backup power operation in case of a total line loss near the midpoint of a half-cycle. Multiple samples of the line sense signal may be taken quickly around the half-cycle peak to enhance the noise immunity of the peak check.

Preferably, any line fault detection algorithm that is used will be capable of rapidly detecting a line fault such that a transfer from line to backup power may be initiated quickly so as to minimize any disruption of power provided to a critical load. For the preferred line fault detection algorithm being described, the response time of the algorithm to a complete loss of line power depends on the magnitude of the input sine wave, the input waveform frequency, and the line sense threshold level of the line sense signal. The higher the magnitude of the input voltage waveform, the longer it will take to detect a line fault. Also, the higher the line sense threshold voltage level of the line sense signal, the longer it will take to detect. The peak check will constrain the line-loss detection time for a break in AC power occurring from 0°–45° or 180°–225° to one-quarter of a cycle. In the last 90° of a half-cycle, the line-loss detection time is equal to the maximum line-loss threshold time minus the accumulated time that the line sense signal has been inactive. A general formula for the maximum line-loss detection time for a line fault occurring during the last 90° of a half cycle is:

$$t_{max} = \frac{2}{\omega} \times \left( \arcsin \left( \frac{\sqrt{2} \times V_{breakpoint}}{2 \times V_{LoRMS}} \right) \right) - \frac{1}{\omega} \times \left( \arcsin \left( \frac{\sqrt{2} \times V_{breakpoint}}{2 \times V_{InRMS}} \right) \right) \quad (2)$$

where $t_{max}$=line-loss threshold time;

$\omega$=line frequency in radians;

$V_{breakpoint}$=line sense threshold voltage level above which the line sense signal is active;

$V_{LoRMS}$=selected RMS voltage level below which a line fault is to be indicated; and $V_{InRMS}$=RMS value of the input voltage waveform.

It should be noted that Equation 2 provides an ideal value for the maximum line-loss detection time of the preferred line fault detection algorithm. Sampling error, circuit latencies, and total harmonic distortion on the input sine wave should be taken into account when calculating the real-world maximum line-loss detection time.

Typical values for Equation 2 are:

$V_{breakpoint}$: 90V $V_{LoRMS}$: 90$V_{RMS}$ $V_{InRMS}$: 120$V_{Rms}$ $\omega$: $2\pi \times 60$ Hz which gives a maximum line-loss detection time of $t_{max}$= 2.68 ms. This shows that, in a typical application, the worst-case line-loss detection time will occur when line power is lost at the beginning of a half cycle, and that this time is limited to one-fourth of the period of the input sine wave by the peak check.

A variation of the preferred line fault detection algorithm integral check may also be used to detect the return of normal AC line power, such that a transition from backup power back to line power operation may be initiated. In order to provide hysteresis between the transfers from line to backup power and back again, a different threshold time, the line-return threshold time, is preferably used for detecting a return of line power. If the duration of the portion of the AC line signal half-cycle during which the line sense signal is active exceeds the line-return threshold time, a return of normal AC line power is indicated, and the system controller 38 may initiate a transfer from backup power operation back to normal line operation by deactivating the power conversion system and closing the line relay 46.

The preferred line fault detection algorithm may be implemented in the system controller 38 using conventional microprocessor programming techniques. The preferred line fault detection algorithm may preferably be implemented using two different interrupt service routines, an interrupt service routine that executes at every zero-cross transition of the input voltage waveform, and a time slice interrupt service routine running at, e.g., 40 times the line cycle frequency.

Figure 6:
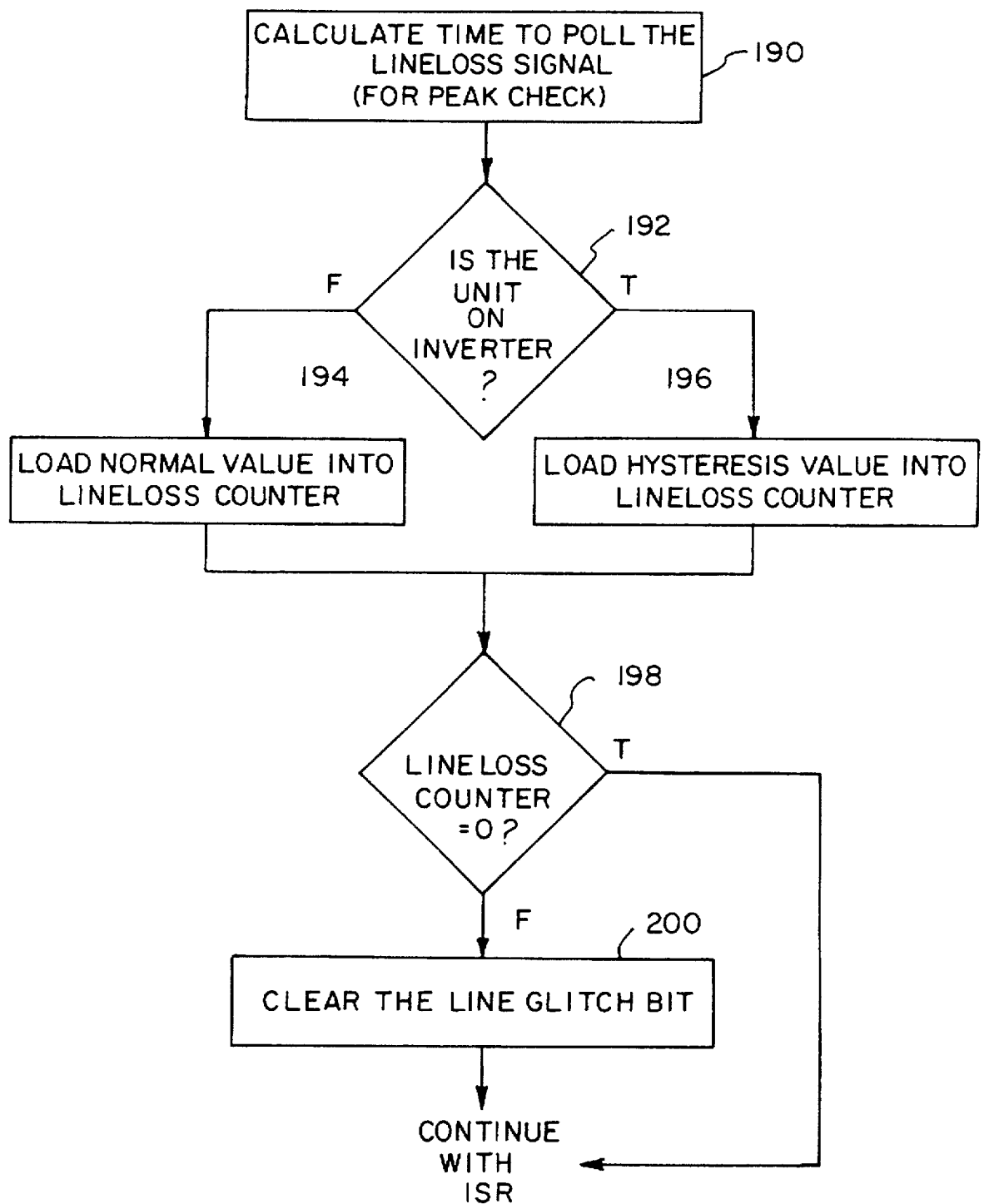
FIGS. 6–8 are flow charts illustrating the steps carried out by a standby power system controller for implementing a preferred line fault detection algorithm in accordance with the present invention.

A flow chart illustrating exemplary steps of the preferred line fault detection algorithm that take place during the zero-cross interrupt service routine is provided in FIG. 6. Upon the occurrence of a line zero-cross, as determined by the zero-cross detector 42, the line fault detection algorithm calculates, at step 190, the time at which the input sine wave will be at its peak. This may be accomplished by dividing the period of the previous half cycle, i.e., the time between the last two previous zero-cross detections, by two, and adding the result to the time of the most recent zero-cross. This value is used to perform the peak check described previously. At step 192, the algorithm determines whether the standby power system 20 is operating on line power, or whether the inverter is actively providing backup power to a load from the system battery 30. If the standby power system 30 is not providing backup power, a line-loss threshold time is entered into a line-loss counter, step 194. If the standby power system 30 is providing backup power, a hysteresis value, the line-return threshold time, is entered into the line-loss counter, step 196. If the line-loss counter was not decremented to zero during the last half cycle, step 198, a return of normal line power is indicated, and a flag that indicates unacceptable line voltage is cleared at step 200. If the line-loss counter was decremented to zero during the last previous half cycle, step 198, however, the line fault flag bit is not cleared, and the zero cross interrupt service routine continues.

Figure 7:
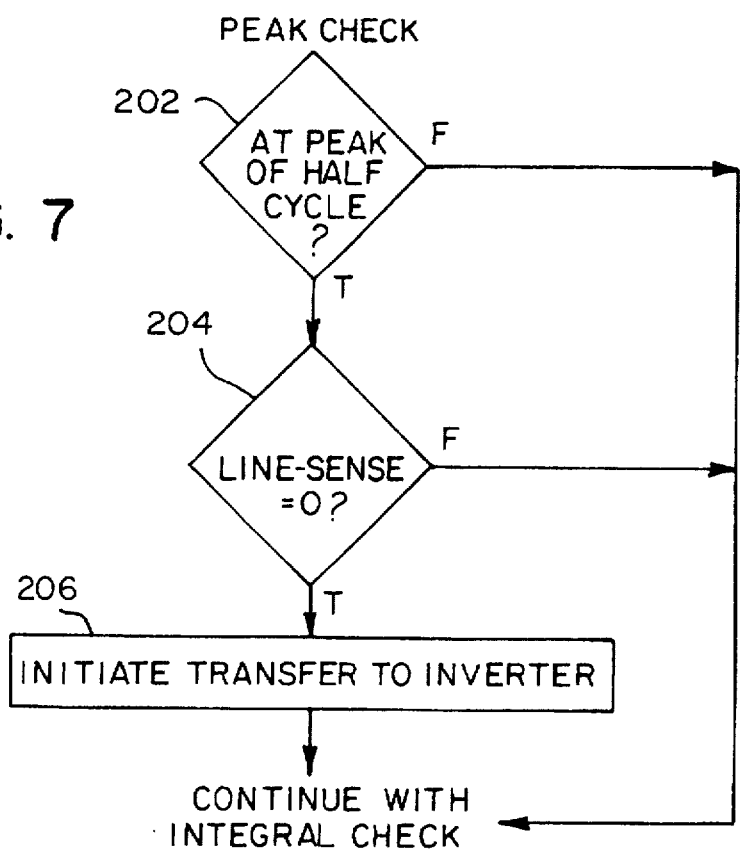
Figure 8:
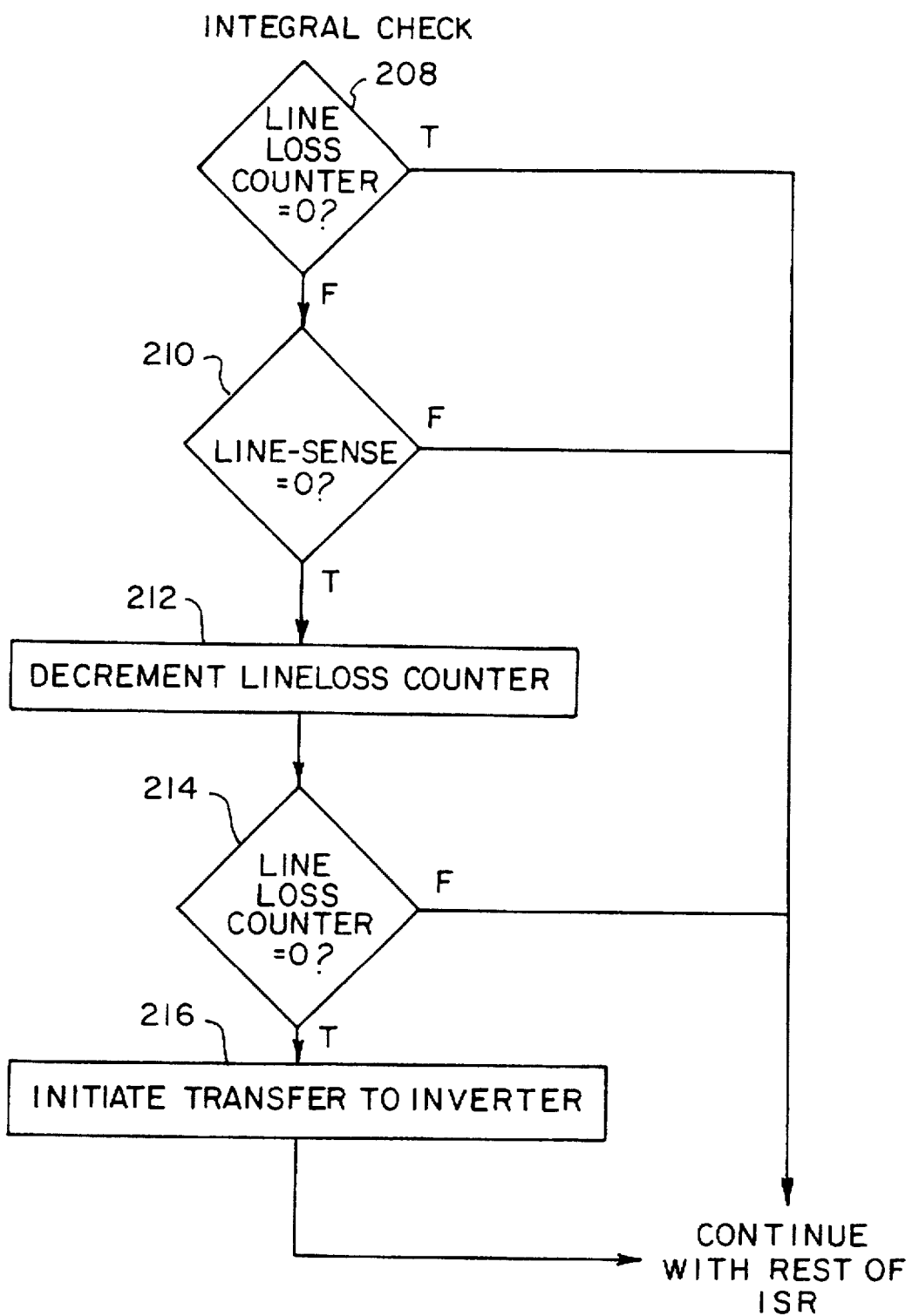

Exemplary steps of the preferred line fault detection algorithm that take place during each time slice interrupt service routine are illustrated in the flow charts of FIGS. 7 and 8. The time slice interrupt service routine is executed periodically, e.g., 40 times, during the input voltage waveform cycle. The time slice interrupt service routine begins at step 202, with a check to see if the current time corresponds to the peak of a half-cycle. If not, the time slice interrupt service routine continues with the integral check. If the input voltage waveform is at the peak of a half-cycle, the line sense signal is polled at step 204. If the line sense signal is inactive at this time, a line fault condition is indicated, and the controller 38 initiates a transfer to providing backup power via the power conversion system at step 206. If the line sense signal is active at the half-cycle, the time slice interrupt service routine continues with the integral check.

The integral check, illustrated in FIG. 8, begins with a check of the present value in the line-loss counter at step 208. If the line-loss counter has been already decremented to zero, indicating that a line fault has been detected and that backup power is being provided to the load, the rest of the integral check is bypassed. If the line-loss counter has not already been decremented to zero, the line sense signal is polled at step 210. If the line sense signal is inactive, indicating that the instantaneous input voltage level is below the line sense signal threshold level, the line-loss counter is decremented at step 212. Otherwise, the integral check is complete. If the line-loss counter is decremented at step 212, the line-loss counter is checked once again at step 214 to determine whether the line-loss counter has been decremented to zero. If so, a line fault is indicated, and transfer from line to backup operation is initiated by the system controller 38 at step 216 by activating the backup power system power conversion system.

It should be noted that the flow charts of FIGS. 6–9 illustrate only one exemplary procedure for implementing a preferred line fault detection algorithm based on the line sense signal. Variations on the exemplary procedure may also be used. Such variations may include, for example, a different ordering of the steps of the algorithm.

Figure 9:
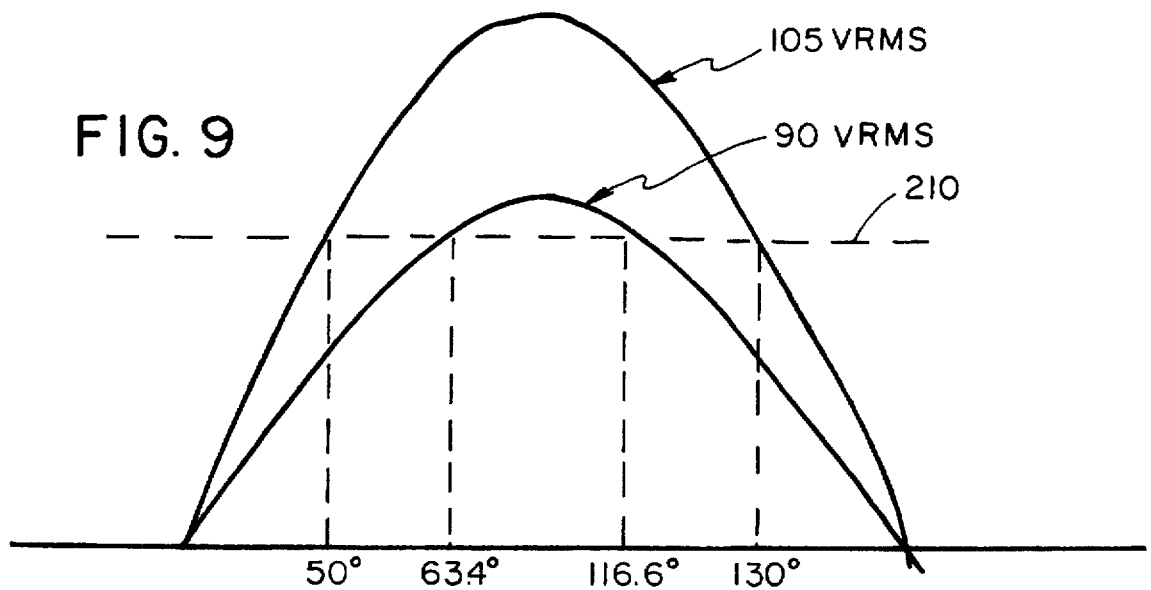
FIG. 9 is an illustrative half-cycle waveform diagram illustrating the operation of an alternative line fault detection algorithm in accordance with the present invention.

An alternative line fault detection algorithm based on the line sense signal provided by the line fault detection system 44 is explained with reference to the half-cycle sine waveforms illustrated in FIG. 9. Assume that the dashed line 210 represents the line sense threshold. When the absolute value of an incoming AC waveform is above the threshold 210, the line sense signal is active; otherwise, the line sense signal is inactive. As illustrated in FIG. 9, as the incoming rms line voltage varies, the phase angles of the half-cycle at which the line sense signal becomes active and inactive also varies. For example, for a given line sense threshold 210, at a 105V rms input voltage level, the line sense signal will become active 50° into the half-cycle, and will become inactive again 130° into the half-cycle. At the same line sense threshold 210, a 90V rms input voltage waveform will cause the line sense signal to become active 63.4° into the half cycle, and to become inactive 116.6° into the half cycle. Thus, by polling the line sense signal at certain phase angles during the half-cycle, the system controller 38 can determine if certain rms line voltage limits are being met.

A point in time at which polling of the line sense signal is to take place may be determined by the system controller 38 based on a selected line-loss or line-return phase angle from the occurrence of the zero-cross detection signal provided by the zero-cross detector 42 indicating the start of a half-cycle. Line-loss detection is preferably suspended when zero-cross deviations are detected, making accurate polling time calculations impossible. Consecutive zero-cross deviations preferably result in a transfer to backup power by the system controller 38. The phase angle at which polling of the line sense signal takes place can be varied to change the approximate voltage limit at which a transfer to backup power, or a transfer from backup power back to line power, occurs. For example, detection of line-loss, and a transfer from line to backup power, might be set for 90V rms, which would correspond to half-cycle polling angles of 63.4° and 116.6° (i.e., a line-loss phase angle of 63.4° from each of the beginning and end of the half-cycle). Detection of a return to suitable line voltage might be set for 105V rms, with corresponding polling angles of 50° and 130° (i.e., a line-return phase angle of 50° from each of the beginning and end of the half-cycle). Line-loss detection is preferably corroborated by multiple checks of the line sense signal within, e.g., 100 microseconds of the polling angle, before any action transferring the system from line to backup power is taken. Detection of nominal line return is preferably corroborated by, e.g., two additional line cycle tests for normal line voltage levels, before any action is taken returning the system from backup to line power. These additional corroboration tests provide this alternative line fault detection algorithm with a degree of noise immunity, preventing undesirable transfers from line to backup power, or vice versa, resulting from glitches or other noise in the AC line waveform. The alternative line fault detection algorithm may be implemented in the system controller 38 using conventional microprocessor programming techniques.

Whichever line fault detection algorithm is employed, the use of the single line sense signal to perform line fault detection makes possible a reduction in the overall cost of the standby power system 20. Since a single digital line sense signal is used for line fault detection, conventional analog-to-digital conversion of the AC line voltage waveform is not required. Moreover, the relatively simple line fault detection algorithms described may be implemented using a low-cost microprocessor. Note also that isolation between the high voltage AC line waveform and the low voltage system controller 38 is maintained by use of the opto-coupler 184 in the line fault detection system 44.

It is understood that the invention is not confined to the particular embodiments and examples set forth herein as illustrative, but embraces all such modified forms thereof as come within the scope of the following claims.

What is claimed is:

1. A standby power system including input terminals adapted to be connected to a source of AC power at line frequency and line voltage levels and output terminals adapted to be connected to a load, the load being provided with line power from the source of AC power under normal line operating conditions, a battery, and a power conversion system for providing backup AC power at the line frequency and line voltage levels to the output terminals from the battery voltage to provide backup power to the load when a failure of the source of AC power is detected, the power conversion system comprising:

(a) a high frequency transformer having a primary winding and a secondary winding;

(b) a high frequency inverter including first and second high frequency switching devices, responsive to high frequency switching control signals to turn the high frequency switching devices on, and connected between the battery and the primary winding of the transformer such that when the first high frequency switching device is turned on the battery voltage is applied in a first polarity to the primary winding of the transformer and when the second high frequency switching device is turned on the battery voltage is applied in a second polarity to the primary winding of the transformer, the high frequency transformer and high frequency inverter thereby operating together to boost the battery voltage applied to the primary winding of the transformer to approximately the line voltage level at the secondary winding of the transformer;

(c) a rectifier connected to the secondary winding of the transformer to rectify a signal appearing on the secondary winding to provide a rectified power signal;

(d) a line frequency inverter including first and second line frequency switching devices, responsive to line frequency switching control signals to turn the line frequency switching devices on, and connected between the rectifier and the output terminals of the standby power system such that when the first line frequency switching device is turned on the rectified power signal is applied in a first polarity to the output terminals of the standby power system and when the second line frequency switching device is turned on the rectified power signal is applied in a second polarity to the output terminals;

(e) high frequency modulator means for providing high frequency switching control signals at a high frequency alternately to the first and second high frequency switching devices and for periodically interrupting the providing of the high frequency switching control signals at a rate of approximately twice the line frequency, thereby providing high frequency battery voltage pulse bursts separated by lower frequency dead times to the primary winding of the transformer causing approximately line voltage level high frequency pulse bursts separated by lower frequency dead times to appear on the secondary winding of the transformer and be rectified by the rectifier into the rectified power signal; and (f) output voltage controller means for providing line frequency switching control signals at a low frequency to the first and second line frequency switching devices to apply the rectified power signal in alternating first and second polarities to the output terminals to provide a stepped square wave output signal at the line frequency and line voltage levels on the output terminals, wherein the stepped square wave output signal includes positive and negative voltage steps corresponding to the high frequency pulse bursts on the secondary winding of the transformer separated by zero-voltage dead times corresponding to the lower frequency dead times on the secondary winding of the transformer.

2. The standby power system of claim 1 comprising additionally an output filter connected between the line frequency inverter and the output terminals of the standby power system to filter high frequency components from the stepped square wave output signal appearing on the output terminals.

3. The standby power system of claim 1 wherein the high frequency modulator means includes means for providing high frequency switching control signals to each of the first and second high frequency switching devices at a rate of at least approximately 45 kHz.

4. The standby power system of claim 1 wherein the high frequency switching devices are MOSFETs.

5. The standby power system of claim 1 wherein each of the first and second high frequency switching devices includes a plurality of switching devices connected in parallel.

6. The standby power system of claim 1 wherein the battery is connected at a first terminal of the battery to a center tap of the primary winding of the transformer, wherein the first high frequency switching device is connected between a second terminal of the battery and a first end of the primary winding, and wherein the second high frequency switching device is connected between the second terminal of the battery and a second end of the primary winding.

7. The standby power system of claim 1 wherein the rectifier is a diode bridge.

8. The standby power system of claim 1 wherein the line frequency switching devices are IGBTs.

9. The standby power system of claim 1 wherein the high frequency modulator means includes an integrated circuit pulse width modulator.

10. The standby power system of claim 1 wherein the output voltage controller means includes a microprocessor programmed to provide the line frequency switching control signals.

11. The standby power system of claim 1 wherein the output voltage controller means includes means for providing line frequency switching control signals simultaneously to both of the first and second line frequency switching devices to thereby turn on both of the line frequency switching devices during the zero-voltage dead times.

12. The standby power system of claim 1 wherein the output voltage controller means includes means for controlling the rms voltage level of the output signal by varying the duration of the voltage steps and the zero-voltage dead times of the stepped square wave output signal.

13. The standby power system of claim 12 wherein the output voltage controller means includes means for determining the rms voltage level of the stepped square wave output signal, means for providing an output voltage control signal when the rms voltage level of the output signal exceeds an rms output voltage level threshold, and means for terminating a positive or negative voltage step in the output signal to initiate the zero-voltage dead time in response to the providing of the output voltage control signal.

14. The standby power system of claim 13 wherein the output voltage controller means includes means for controlling the high frequency modulator means to reduce a pulse width of the high frequency switching control signals if the output voltage control signal is provided near the start of a positive or negative voltage step in the output signal.

15. The standby power system of claim 13 wherein the means for determining the rms voltage level of the stepped square wave output signal includes an integration circuit including an integrator resistor connected in series with a capacitor across the output terminals of the standby power system, a piece-wise approximation modification to the integration circuit including two zener diodes connected back-to-back in series with each other and in series with a second resistor, the piece-wise approximation circuit connected in parallel with the integrator resistor and in series with the capacitor, and an rms voltage rectifier for rectifying a voltage across the capacitor to provide a rectified voltage signal whose peak value corresponds approximately to the rms voltage level of the output signal; and wherein the means for providing the output voltage control signal includes a control signal zener diode connected to the rms voltage rectifier such that the breakdown voltage of the control signal zener diode is exceeded by the rectified rms output voltage signal causing the control signal zener diode to conduct to provide the output voltage control signal when the rms output voltage level of the output signal exceeds the rms output voltage level threshold.

16. The standby power system of claim 13 wherein the output voltage controller means further includes means for determining a peak output voltage level on the output terminals of the standby power system and means for providing the output voltage control signal when the peak output voltage level exceeds a peak output voltage threshold.

17. The standby power system of claim 16 wherein the means for determining the peak output voltage level on the output terminals includes at least two voltage dividing resistors connected in series with each other across the output terminals and a peak voltage rectifier for rectifying the voltage across a one of the voltage dividing resistors to provide a rectified peak output voltage level signal; and wherein the means for providing the output voltage control signal includes a control signal zener diode connected to the peak voltage rectifier such that the breakdown voltage of the control signal zener diode is exceeded by the rectified peak output voltage level signal causing the control signal zener diode to conduct to provide the output voltage control signal when the peak output voltage level exceeds the peak output voltage threshold.

18. The standby power system of claim 17 wherein the voltage dividing resistors are varistors having variable resistance values selected such that the varistors conduct to clamp the peak output voltage level on the output terminals of the standby power system to a maximum output voltage level when the voltage level across the output terminals of the standby power system exceeds a maximum output voltage level threshold.

19. The standby power system of claim 1 additionally comprising means for detecting a failure of the source of AC power and for transitioning from providing line power to the load to providing backup power to the load when a failure of the source of AC power is detected, including:

(a) means for providing a line sense signal that is active when the input voltage level across the input terminals of the standby power system exceeds a line sense threshold level and that is inactive when the input voltage level is less than the line sense threshold level; and (b) means for providing the high frequency and line frequency switching control signals to activate the power conversion system to provide backup power to the load when either a duration of a portion of a half-cycle of the source of AC power during which the line sense signal is inactive is greater than a line-loss threshold time or the line sense signal is inactive at a time corresponding to a peak of the half-cycle of the source of AC power.

20. The standby power system of claim 19 wherein the means for providing the line sense signal includes a line sense rectifier connected across the input terminals of the standby power system to provide a rectified line voltage signal, and a line sense zener diode connected to the line sense rectifier such that the breakdown voltage of the line sense zener diode is exceeded by the rectified line voltage signal causing the line sense zener diode to conduct to provide the line sense signal when the input voltage level across the input terminals exceeds the line sense threshold level.

21. A standby power system including input terminals adapted to be connected to a source of AC power at line frequency and line voltage levels and output terminals adapted to be connected to a load, the load being provided with line power from the source of AC power under normal line operating conditions, a battery, and a power conversion system for providing backup AC power at line frequency and line voltage levels on the output terminals from the battery voltage to provide backup power to the load when a failure of the source of AC power is detected, the power conversion system comprising:

(a) power conversion means for providing a stepped square wave output signal at line frequency and line voltage levels to the output terminals of the standby power system from the battery voltage, the stepped square wave output signal including positive and negative voltage steps separated by zero-voltage dead times; and (b) output voltage controller means for varying the duration of the voltage steps and the zero-voltage dead times of the stepped square wave output signal to control the rms voltage level of the output signal, including means for determining the rms voltage level of the stepped square wave output signal, means for providing an output voltage control signal when the rms voltage level of the output signal exceeds an rms output voltage level threshold, and means for terminating a positive or negative voltage step in the output signal to initiate the zero-voltage dead time in response to the providing of the output voltage control signal.

22. The standby power system of claim 21 wherein the means for determining the rms voltage level of the stepped square wave output signal includes an integration circuit including an integrator resistor connected in series with a capacitor across the output terminals of the standby power system, a piece-wise approximation modification to the integration circuit including two zener diodes connected back-to-back in series with each other and in series with a second resistor, the piece-wise approximation circuit connected in parallel with the integrator resistor and in series with the capacitor, and an rms voltage rectifier for rectifying a voltage across the capacitor to provide a rectified voltage signal whose peak value corresponds approximately to the rms voltage level of the output signal; and wherein the means for providing the output voltage control signal includes a control signal zener diode connected to the rms voltage rectifier such that the breakdown voltage of the control signal zener diode is exceeded by the rectified rms output voltage signal causing the control signal zener diode to conduct to provide the output voltage control signal when the rms output voltage level of the output signal exceeds the rms output voltage level threshold.

23. The standby power system of claim 22 wherein the output voltage controller means further includes means for determining a peak output voltage level on the output terminals of the standby power system and means for providing the output voltage control signal when the peak output voltage level exceeds a peak output voltage threshold.

24. The standby power system of claim 23 wherein the means for determining the peak output voltage level on the output terminals includes at least two voltage dividing resistors connected in series with each other across the output terminals and a peak voltage rectifier connected across a one of the voltage dividing resistors for rectifying the voltage across the one of the voltage dividing resistors to provide a rectified peak output voltage level signal; and wherein the means for providing the output voltage control signal includes the control signal zener diode connected to the peak voltage rectifier such that the breakdown voltage of the control signal zener diode is exceeded by the rectified peak output voltage level signal causing the control signal zener diode to conduct to provide the output voltage control signal when the peak output voltage level exceeds the peak output voltage threshold.

25. The standby power system of claim 24 wherein the voltage dividing resistors are varistors having variable resistance values selected such that the varistors conduct to clamp the peak output voltage level on the output terminals of the standby power system to a maximum output voltage level when the voltage level across the output terminals of the standby power system exceeds a maximum output voltage level threshold.

26. The standby power system of claim 24 wherein the output voltage controller means includes a microprocessor and wherein the output voltage control signal is provided to the microprocessor via an opto-coupler connected between the control signal zener diode and the microprocessor to maintain isolation between the output terminals of the standby power system and the microprocessor.

27. The standby power system of claim 21 additionally comprising means for detecting a failure of the source of AC power and for transitioning from providing line power to the load to providing backup power to the load when a failure of the source of AC power is detected, including:

(a) means for providing a line sense signal that is active when the input voltage level across the input terminals of the standby power system exceeds a line sense threshold level and that is inactive when the input voltage level is less than the line sense threshold level; and (b) means for activating the power conversion system to provide backup power to the load when either a duration of a portion of a half-cycle of the source of AC power during which the line sense signal is inactive is greater than a line-loss threshold time or the line sense signal is inactive at a time corresponding to a peak of the half-cycle of the source of AC power.

28. The standby power system of claim 27 wherein the means for providing the line sense signal includes a line sense rectifier connected across the input terminals of the standby power system to provide a rectified line voltage signal, and a line sense zener diode connected to the line sense rectifier such that the breakdown voltage of the line sense zener diode is exceeded by the rectified line voltage signal causing the line sense zener diode to conduct to provide the line sense signal when the input voltage level across the input terminals exceeds the line sense threshold level.

29. A method for providing an AC power signal at line frequency and line voltage levels to the output terminals of a power system such as a backup power system from the voltage provided by a battery, comprising the steps of:

(a) alternately connecting opposite polarities of the battery voltage at a high frequency to the primary winding of a high frequency transformer such that the battery voltage is boosted to approximately the line voltage level on a secondary winding of the transformer;

(b) periodically interrupting the step of connecting the battery voltage to the transformer at a rate of twice the line frequency such that high frequency positive and negative battery voltage pulse bursts separated by lower frequency dead times are applied to the primary winding of the transformer causing approximately line voltage level high frequency positive and negative pulse bursts separated by lower frequency dead times to appear on the secondary winding of the transformer;

(c) rectifying the high frequency pulse bursts appearing on the secondary winding of the transformer to provide a rectified power signal; and (d) applying the rectified power signal in alternating polarities to the output terminals to provide a stepped square wave output signal at line frequency and line voltage levels on the output terminals, wherein the stepped square wave output signal includes positive and negative voltage steps corresponding to the high frequency pulse bursts on the secondary winding of the transformer separated by zero-voltage dead times corresponding to the lower frequency dead times on the secondary winding of the transformer.

30. The method of claim 29 comprising additionally the step of filtering high frequency signal components from the stepped square wave output signal on the output terminals.

31. The method of claim 29 comprising additionally the step of controlling the rms voltage level of the output signal by varying the duration of the voltage steps and the zero-voltage dead times of the stepped square wave output signal.

32. The method of claim 31 wherein the step of controlling the rms voltage level of the output signal includes the steps of:

(a) providing an output voltage control signal when the rms voltage level of the output signal exceeds an rms output voltage level threshold; and (b) terminating a positive or negative voltage step in the output signal to initiate the zero-voltage dead time when the output voltage control signal is provided.

33. The method of claim 32 including additionally the step of varying a pulse width of the high frequency battery voltage pulses forming the high frequency battery voltage pulse bursts if the output voltage control signal is provided near the start of a positive or negative voltage step in the output signal.

34. The method of claim 32 including additionally the step of providing the output voltage control signal when the peak output voltage level exceeds a peak output voltage threshold.

35. The method of claim 34 including additionally the step of clamping the peak output voltage level on the output terminals to a maximum output voltage level when the voltage level across the output terminals exceeds a maximum output voltage level threshold.

* * * * *